US011022505B2

(12) United States Patent
Bongards et al.

(10) Patent No.: US 11,022,505 B2
(45) Date of Patent: Jun. 1, 2021

(54) FIBER-REINFORCED COMPOSITE MATERIAL WITH A SENSOR ASSEMBLY FOR MONITORING THE STRUCTURE OF THE COMPOSITE MATERIAL

(71) Applicant: TECHNISCHE HOCHSCHULE KÖLN, Köhn (DE)

(72) Inventors: Michael Bongards, Kierspe (DE); Hartmut Köhn, Gummersbach (DE)

(73) Assignee: TECHNISCHE HOCHSCHULE KÖLN, Köln (DE)

( * ) Notice: Subject to any disclaimer, the term of this patent is extended or adjusted under 35 U.S.C. 154(b) by 0 days.

(21) Appl. No.: 16/084,502

(22) PCT Filed: Mar. 15, 2017

(86) PCT No.: PCT/EP2017/056109
§ 371 (c)(1),
(2) Date: Sep. 12, 2018

(87) PCT Pub. No.: WO2017/158013
PCT Pub. Date: Sep. 21, 2017

(65) Prior Publication Data
US 2019/0078947 A1 Mar. 14, 2019

(30) Foreign Application Priority Data
Mar. 15, 2016 (DE) .................... 10 2016 104 725.2

(51) Int. Cl.
*G01L 1/20* (2006.01)
*G01L 1/22* (2006.01)

(52) U.S. Cl.
CPC .............. *G01L 1/205* (2013.01); *G01L 1/225* (2013.01); *G01L 1/2287* (2013.01)

(58) Field of Classification Search
CPC ....... G01L 1/205; G01L 1/225; G01L 1/2287; G01M 5/0016
(Continued)

(56) References Cited

U.S. PATENT DOCUMENTS

| 4,429,413 A | 1/1984 | Edwards |
| 4,581,527 A * | 4/1986 | Crane ................. G01M 11/086 250/227.14 |

(Continued)

FOREIGN PATENT DOCUMENTS

| DE | 3636074 A1 | 4/1988 |
| DE | 102008058882 | 6/2010 |

(Continued)

OTHER PUBLICATIONS

International Search Report from the International PCT Application No. PCT/EP2017/053109 dated Jun. 14, 2017.

*Primary Examiner* — Octavia Hollington
(74) *Attorney, Agent, or Firm* — Davidson, Davidson & Kappel, LLC

(57) ABSTRACT

A fiber-reinforced composite material having a sensor array of a plurality of sensors for structural health monitoring of the composite material, and also having electrical conducting paths incorporated in the composite material and extending through the composite material. The electrical conducting paths are arranged in a first group and in a second group different from the first group, with the first group extending in a first direction, and the second group extending in a second direction and intersecting the electrical conducting path of the first group. The intersecting paths form together with the conducting paths of first group a network of n row conductors and m column conductors. There is also a signal processing means for monitoring at least one electrical characteristic of the conducting paths.

12 Claims, 1 Drawing Sheet

(According to the invention)

(58) Field of Classification Search
USPC .................................. 73/862.041–862.046
See application file for complete search history.

(56) References Cited

U.S. PATENT DOCUMENTS

| | | | | |
|---|---|---|---|---|
| 6,987,871 | B2 * | 1/2006 | Kalnitsky | G06F 3/044 |
| | | | | 324/688 |
| 7,514,842 | B2 * | 4/2009 | Scott | G06K 9/0002 |
| | | | | 310/316.01 |
| 7,546,982 | B2 | 6/2009 | Sneed | |
| 8,416,213 | B2 * | 4/2013 | Shen | G06F 3/0414 |
| | | | | 178/18.05 |
| 8,534,133 | B2 * | 9/2013 | Hucker | B29C 70/10 |
| | | | | 73/777 |
| 8,800,386 | B2 * | 8/2014 | Taylor | G01L 1/18 |
| | | | | 73/862.044 |
| 10,151,649 | B2 * | 12/2018 | Lewis | G01L 1/2287 |
| 2010/0119704 | A1 | 5/2010 | Hemmelgarn et al. | |
| 2011/0050258 | A1 | 3/2011 | Katazawa et al. | |
| 2011/0086224 | A1 * | 4/2011 | Volpi | B60C 9/04 |
| | | | | 428/369 |
| 2014/0283630 | A1 * | 9/2014 | Mourey | G01D 11/00 |
| | | | | 73/865.8 |

FOREIGN PATENT DOCUMENTS

| | | |
|---|---|---|
| EP | 071269 | 2/1983 |
| WO | WO9953283 | 10/1999 |
| WO | WO2005024371 | 3/2005 |
| WO | WO2010004324 | 1/2010 |
| WO | WO2010101633 | 9/2010 |
| WO | WO2015073944 | 5/2015 |

* cited by examiner

Figure 2 (According to the invention)

FIBER-REINFORCED COMPOSITE MATERIAL WITH A SENSOR ASSEMBLY FOR MONITORING THE STRUCTURE OF THE COMPOSITE MATERIAL

This application is a U.S. national phase application under 35 U.S.C. of § 371 of International Application No. PCT/EP2017/056109, filed Mar. 15, 2017, which claims priority of German Patent Application No. DE 10 2016 104 725.2, filed Mar. 15, 2016, the disclosures of which are hereby incorporated by reference herein.

The invention relates to a fiber-reinforced composite material comprising a sensor array of a plurality of sensors for structural health monitoring of the composite material, wherein electrical conducting paths are incorporated in the composite material and extend through the composite material, wherein the electrical conducting paths are arranged in a first group and in a second group different from the first group, wherein the electrical conducting paths of the first group extend in a first direction, the electrical conducting paths of the second group extend in a second direction and intersect the electrical conducting paths of the first group and thus form together with the conducting paths of first group a network of n row conductors and m column conductors, and wherein a signal processing means for monitoring at least one electrical characteristic of the conducting paths is provided.

Due to their good mechanical characteristics, fiber-reinforced composites are used for structures in various industrial sectors, e.g. in the aerospace and wind energy industries and in automobile manufacturing and in mechanical and plant engineering, wherein their use has increased significantly in recent years. In these application fields, fiber-reinforced composite materials are often exposed to high loads. In order to detect damages in an early stage and to keep the economic consequences low in the event of damages, it is necessary to use a suitable sensor system, since damages to components made of composite materials are usually not visible externally. Methods known from material tests of non-destructive testing of components such as ultrasound, X-ray and thermography quickly reach their limits in assessing damages. Another disadvantage of these methods is that they cannot be performed during operation or require expensive testing equipment and complex testing procedures. Therefore, there is a high demand for structural health monitoring (SHM) systems that provide continuous or periodic and automated methods for determining and monitoring the state of a monitored object.

For monitoring, sensors remaining permanently in the structure are advantageous. Such an SHM system therefore consists e.g. of a network of permanently applied sensors as well as components for signal processing and analysis. In this way, structures can be continuously checked for damage events during operation so that damages can be detected and localized in an early stage. Based on the knowledge on the state of the structure, preventive measures can be taken in order to extend the life of the structure and prevent catastrophic failure. Standstill due to repair or maintenance works is economically unprofitable and can be avoided thereby.

From the state of the art, mechanical and fiber-optic strain gauges for detecting expanding and compressive deformations of the structure of fiber-reinforced composite materials are known. However, these have the disadvantage that, although deformations can be detected, fractures of fibers of the composite materials possibly may not be recognized.

For this purpose, other methods are known from the prior art in which strain sensors are replaced by electrical conductors and incorporated into the fiber-reinforced composite material. Changes in the electrical characteristics of the conductors as well as breaks in the conductors are indicative of damages of the composite material to be monitored.

From WO 2005/024371 A1 a sensor for monitoring a structure is known, wherein the sensor comprises a network of interconnected electrical lines and changes in the electrical characteristic of the lines are measured. A change in the predetermined physical characteristic of the structure results in a change in the electrical characteristic of the lines, whereby damage of the structure can be identified and located.

Moreover, from WO 2010/004324 A1 an arrangement for monitoring the state of fiber-reinforced composite materials is known, wherein electrically conductive fibers are incorporated in the composite material and define electrical paths. A detector detects changes in the electrical characteristic of the paths. Here, the grid nodes of the network formed from the electrical paths can be closed, that is, electrically connected to one another, or be open. In order to detect a damage event, the electrical characteristics or the electrical continuity of the paths are monitored.

A disadvantage of a closed network is that measurements of the electrical characteristics of the network, such as the resistance, must be compared with reference tables from reference measurements for detecting a damage event. On the other hand, in an open network it is disadvantageous that both ends must be contacted for monitoring the continuity of the conductors. If one wishes to selectively evaluate a plurality of such sensor elements, a test voltage must be applied to each individual one of these sensor elements, and the current flowing out over the individual sensor elements must be measured selectively. For n row conductors and m column conductors, therefore, 2(n+m) lines are necessary.

A further disadvantage is that in case of a broken conductor due to loads of the composite material, this conductor path is no longer available for the further detection of damages such that further damages along this conducting path can no longer be detected. Furthermore, embedding the previously described sensors has a significant effect on the mechanical characteristics and the integrity of the fiber composite material to be monitored, since the outer terminals for contacting and readout must be fed through the fiber composite material to the outside.

It is an object of the invention to provide a fiber-reinforced composite material comprising a sensor array of a plurality of sensors for structural health monitoring of the composite material, wherein the state of the composite material as well as damages such as caused by fiber cracks can be detected spatially resolved.

The object is achieved by the subject matter of claim 1. Advantageous embodiments of the invention are specified in the dependent claims.

In a fiber-reinforced composite material comprising a sensor array of a plurality of sensors for structural health monitoring of the composite material of the type described above, the object is achieved according to the invention in that in each intersection area of an electrical conducting path of the first group with an electrical conducting path of the second group, a diode is disposed, wherein the connection between the row conductor and the column conductor is made by means of the diode, so that a network in the form of a diode matrix is formed.

The individual diodes are thus operated according to the invention in a matrix wiring, such that the number of external electrical terminals is reduced. In addition, in this way it can also be ensured that the reliability of the structural health monitoring is not reduced even in the case of damages of the composite material. It should be mentioned that the matrix wiring is to be understood here only as a circuit arrangement. It is not necessary for row and column conductors to be arranged in a regular grid distribution. Moreover, they do not have to extend straight and parallel or perpendicular to each other. Instead, the diode matrix can be adapted to the shape and the characteristics of the structure of the fiber-reinforced composite material to be monitored.

The above-mentioned diode matrix is also referred to as a passive matrix in electrical engineering, the wiring of which can be effected by a variety of available integrated devices. In a matrix configuration, each intersection point of the matrix can be driven individually by activating a corresponding column driver in conjunction with the activation of a corresponding row driver. Therefore, in a preferred embodiment, each intersection area is driven by the signal processing means by means of row and column drivers. The task of the row and column drivers consists in cyclical driving the electrodes of the diodes with different voltages of different polarity.

In a further preferred embodiment, the row and column drivers are configured as shift registers. Shift registers belong to logic devices and allow the parallel output of a serial data stream. An advantage resulting therefrom is that microcontrollers can be used whose inputs/outputs are significantly fewer in number than the number of rows and columns.

The signal processing means is formed in a preferred embodiment as an application-specific integrated circuit. In a further preferred embodiment, the row and column conductors and/or the diodes connected between the row conductors and column conductors have a similar elongation at break as the composite material to be monitored. Herein, it is advantageous if the elongation at break of the row conductors and column conductors and/or the diodes is equal to or smaller than the elongation at break of the fiber-reinforced composite material. If the composite material is loaded in such a way that fiber breaks occur therein, the row conductors and column conductors and/or the diodes break, too. The electrical current flow through this conductor path is interrupted, whereby the damage is detectable. Damages can thus be detected in an early stage, wherein the row conductors and the column conductors and/or the diodes break either simultaneously with the fibers of the composite material or earlier, thereby avoiding undetected fiber breaks.

In an additional embodiment, the network can be arranged in the form of a diode matrix without own mechanical stabilizing means within the fiber-reinforced composite material. The installation of the diode matrix thus takes place in this embodiment by lamination the individual conductors into the layer structure of the fiber-reinforced composite material. Thus, for example, it is possible to incorporate the diode matrix in common between two fiber mats of the composite material. This embodiment has the advantage that the layer structure of the composite material is disturbed as little as possible and the conductors have a contact as intimate as possible with the individual layers of the composite material. In this way, the mechanical sensitivity of the diode matrix can be increased and the composite material is not disturbed/weakened in its mechanical characteristics by an additional layer. In addition, this embodiment enables the diode matrix to be adapted as accurately as possible to the contours of the composite material.

In a preferred embodiment, the network can be arranged in the form of a diode matrix by means of an own carrier layer within the fiber-reinforced composite material. Under a separate support layer of this embodiment, in particular all kinds of layers or, for example films, can be understood, which are not necessary for the construction of the composite material. Thus, for example, the diode matrix can be applied to a thin film and then the diode matrix applied onto the film can be introduced as a separate layer in the composite material. This embodiment can lead to a faster production, since the diode matrix can already be prefabricated on the separate layer. In addition, in this embodiment a positioning of the conducting paths as accurate as possible is enabled, so that a further positioning at the component can be omitted. In particular, in this way complex constructed components, such as parts of aircraft landing gears, can be equipped with precisely positioned diode arrays.

In a further embodiment, the alignment of either the row conductors or the column conductors can be carried out substantially parallel to the fiber direction of the fiber-reinforced composite material. It may be particularly preferred to align the conducting paths so that they match with the symmetry of the composite material, i.e. coincide with the orientation of the fibers. In this way, it is ensured that at least one orientation of the conducting paths takes place parallel to the fiber direction and thus the conducting paths correspond to the main components (parallel and perpendicular to the mechanical preferred direction of the composite material) of the forces acting on the composite material. This embodiment can help to provide a more reliable image of the forces acting on the composite material.

Furthermore, in a preferred embodiment, the distance between the row conductors or the distance between the column conductors or the distance both between the row conductors and between the column conductors may vary across the composite material. As a function of the symmetry of the component and as a function of the symmetry of the forces to be expected, it may be useful that the distances between the individual conductors are not constant but rather are varied as a function of the aforementioned influencing variables. Thus, for example, surfaces or volumes with high mechanical stress can be monitored with a smaller distance between the conductors, while mechanically less exposed surfaces can have a lower density of conductors. In this way, the diode matrix can map more reliably mechanical conditions. Here, in any case the variations of the distance must be greater than the manufacturing tolerances of the distances of the diode matrix. This can be assumed if the distance between two adjacent row or column conductors deviates by more than 10%.

Within a further aspect of the invention, at least two independent diode matrices arranged parallel to one another may be arranged in the fiber-reinforced composite material. In order to reliably map the forces acting on a complex three-dimensional component, it may be useful to introduce several independent diode matrices into the composite material. This can be implemented, for example, by laminating independent diode matrices between different layers of the composite material. This results in electrically independent networks whose surfaces are arranged parallel to each other. In this way, the different mechanical loads in the depth of the component can be detected in a defined way. In addition, there is also a redundancy, since even if one complete diode matrix fails, further information can be retrieved from the remaining diode matrices.

According to a further preferred embodiment, the network in the form of a diode matrix can form a three-dimensional network within the fiber-reinforced composite material. With this configuration, it is possible to map the mechanical load of a three-dimensional composite material as accurately as possible. At this point not only information from one layer, but also information from the depth of the component is obtained. The formation of the three-dimensional network can be implemented by special electrical contacts or contact points of the individual diode matrices which are able to pierce the individual layers of the composite material and to establish an electrical connection between the individual diode matrices. In this way, an electrical three-dimensional network can be formed.

In a preferred embodiment, the invention also includes a method for monitoring the structure of a previously described fiber-reinforced composite material comprising the following steps:

- biasing the diode matrix with a voltage by means of the signal processing means via the electrical conducting paths of a first group and the electrical conducting paths of a second group in the form that the diodes of the diode matrix connected in the intersection area of the electrical conducting paths of a first group and the electrical conducting paths of a second group are operated in the reverse direction,
- reversing the polarity of the voltage for an electrical conducting path of a first group and of an electrical conducting path of a second group, whereby the diode connected in the intersection area of the electrical conducting path of a first group and of an electrical conducting path of a second group is driven in the forward direction,
- measuring the current flow via the electrical conducting path of a first group of the diode connected at the intersection point in the forward direction and the electrical conducting paths of a second group by means of the signal processing means,
- detecting a damage in the area of the conducting route due to an interruption of the current flow through a defective conducting path and/or diode and
- repeating the previous steps, wherein in a re-measurement of the current flow by means of the signal processing means, the electrical conducting path of the first and/or second group is different from the previous measurement.

For a continuity testing of a conductor path along the row conductors and column conductors of the diode matrix, this is thus biased so that the diodes are operated in the reverse direction, while the diode matrix for checking the integrity of a specific conducting route and thus the integrity of the composite material for respectively one row and one column is biased in the opposite direction, i.e. in the forward direction of the diodes, so that a continuity test can be carried out. With this sensor array for structural health monitoring, a diode matrix can be interrogated with up to n times m intersection points, wherein a defect can be accurately located by the stepwise testing of the conducting routes along the row conductors and column conductors of the diode matrix.

In a preferred embodiment of the method, the total power consumption of the sensor array for structural health monitoring of the composite material is measured. Since the power consumption of the electronics is very low compared to the sensor, a damage of the composite material and thus the diode can be detected very quickly. For the accurate localization of the damage then the diodes are tested step by step.

The invention will be further explained on the basis of a preferred embodiment of the invention with reference to the drawings. In the drawings:

FIG. 2 is a fiber composite material with an embedded sensor network according to a preferred embodiment of the invention.

Figure 1:
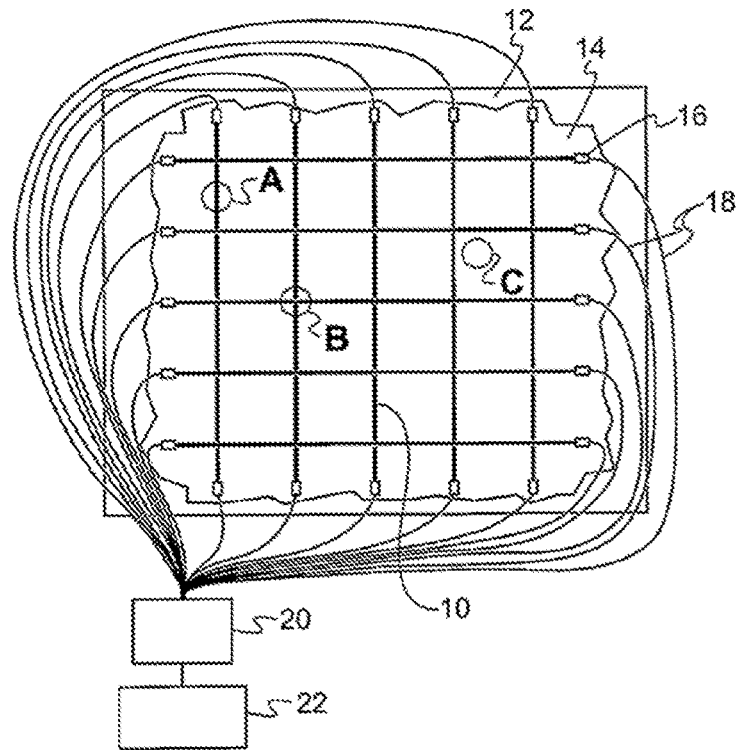
FIG. 1 is a schematic representation of a sensor network of the prior art.
Figure 1:
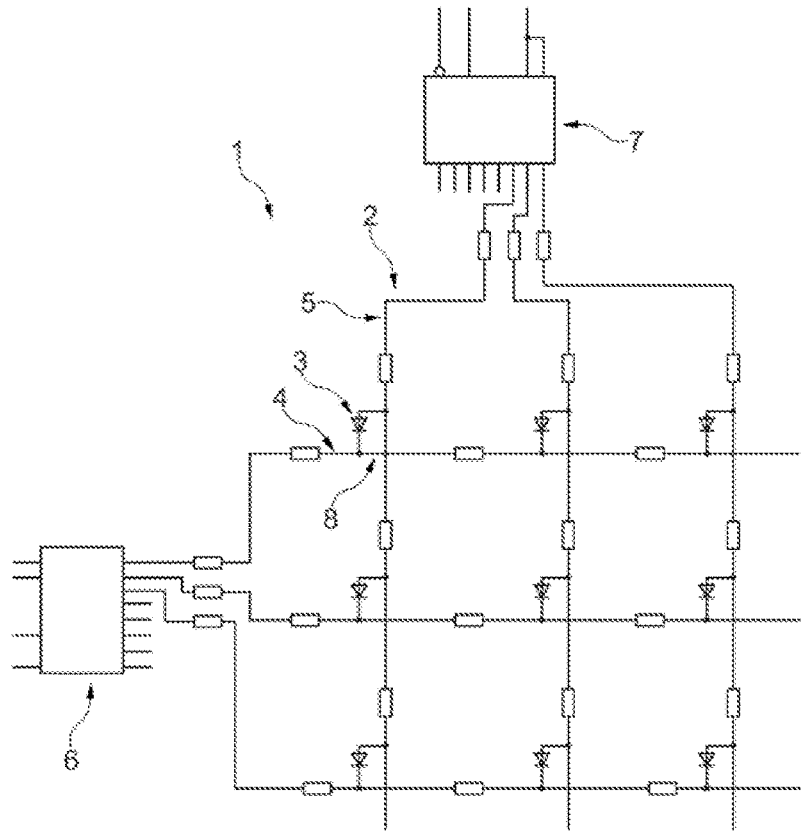

FIG. 1 shows an example of an open sensor network of the prior art wherein conductors 10 in the form of a grid 14 of row conductors and column conductors are incorporated into a fiber-reinforced composite material 12. Each conductor 10 is connected at both conductor ends 16 with a measuring line 18, wherein the measuring lines 18 are connected to a measuring device 20 for measuring a physical characteristic of the conductors 10. If one wishes to selectively evaluate several of the conductors 10, a test voltage must be applied to each of these conductors 10 by means of the measuring lines 18 and the current flowing out via the individual conductors 10 must be measured selectively. In a grid 14 formed of n row conductors and m column conductors, therefore, 2(n+m) lines are necessary. A disadvantage of the sensor network known from the prior art is that, if breaks in the conductors 18 occur, indeed a damage is detected, but further damages to the same conductor at another location cannot be detected.

FIG. 2 shows a fiber-reinforced composite material 1 comprising a sensor array of a plurality of sensors for structural health monitoring of the composite material according to a preferred embodiment of the invention. The electrical conductors 4, 5 of the sensor array are integrated into the fiber structure of the composite material 1, wherein they form a network of row conductors 4 and column conductors 5. At each intersection point 8 a diode 3 is arranged, wherein the diode 3 establishes the connection between row conductor 4 and column conductor 5, so that a network in the form of a diode matrix 2 is formed. The row conductors 4 and column conductors 5 and/or diodes 3 in this case have the same or a slightly smaller elongation at break than the composite material 1 to be monitored.

If the composite material 1 is loaded in such a way that fiber breaks occur therein, the row conductors 4 and column conductors 5 and/or diodes 3 break, too. The electric current flow through the conductors is interrupted. A damage is now detectable by the fact that each diode 3 located in the intersection points 8 can be driven by the signal processing means by use of row drivers 6 and column drivers 7, wherein the row drivers 6 and column drivers 7 have the task of cyclically driving of the electrodes of the diodes 3 with different voltages of different polarity.

The continuity test of a conducting route via the row conductors 4 and column conductors 5 of the diode matrix 3 is now effected in such a way that the diode matrix is biased such that the diodes 3 are operated in the reverse direction, while for checking the integrity of a specific conducting route and thus the integrity of the composite material 1 for respectively one row and one column the diode matrix 2 is biased in the reverse direction, i.e. the diode 3 is operated in the forward direction, so that a continuity test can be carried out via the corresponding row conductors 4 and column conductors 5. If all intersection points 8 of the diode matrix are successively checked for a specific pair of row conductors 4 and column conductors 5, a defect can be localized and restricted to the region between two intersection points.

LIST OF REFERENCE SYMBOLS 1 fiber-reinforced composite material
2 diode matrix
3 diode
4 row conductor
5 column conductor
6 row driver
7 column driver
8 intersection point

The invention claimed is:

1. A fiber-reinforced composite material (1) comprising a sensor array of a plurality of sensors for structural health monitoring of the composite material, wherein
   electrical conducting paths (4, 5) are incorporated in the composite material (1) and extend through the composite material,
   the electrical conducting paths are arranged in a first group and in a second group different from the first group, wherein
   the electrical conducting paths of the first group extend in a first direction,
   the electrical conducting paths of the second group extend in a direction different from the first direction and intersect the electrical conducting paths of the first group and thus form together with the conducting paths of the first group a network of n row conductors (4) and m column conductors (5), and
   a signal processing means for monitoring at least one electrical characteristic of the connecting paths is provided, whereby the structural state of the composite material (1) can be determined;
   wherein a diode (3) is arranged in each intersection area (8) of an electrical conducting path of the first group with an electrical conducting path of the second group,
   wherein by means of the diode (3) the connection between the row conductor (4) and column conductor (5) is established so that a network in the form of a diode matrix (2) is formed
   characterized in that
   the row conductors (4) and the column conductors and/or the diode (3) connected between the row conductor (4) and column conductor (5) have a similar elongation at break as the composite material to be monitored, preferably the same or a smaller elongation at break.

2. The fiber-reinforced composite material according to claim 1, characterized in that each intersection area (8) can be driven by the signal processing means by means of row drivers (6) and column drivers (7).

3. The fiber-reinforced composite material according to claim 2, characterized in that the row drivers (6) and column drivers (7) are configured as shift registers.

4. The fiber-reinforced composite material according to claim 1, characterized in that the signal processing means is configured as an application-specific integrated circuit.

5. The fiber-reinforced composite material according to claim 1, characterized in that the network in the form of a diode matrix (2) is arranged within the fiber-reinforced composite material (1) without own mechanical stabilizing means.

6. The fiber-reinforced composite material according to claim 1, characterized in that the network in the form of a diode matrix (2) is arranged within the fiber-reinforced composite material (1) by means of a separate carrier layer.

7. The fiber-reinforced composite material according to claim 1, characterized in that the alignment of either the row conductors (4) or the column conductors (5) is carried out substantially parallel to the fiber direction of the fiber-reinforced composite material (1).

8. The fiber-reinforced composite material according to claim 1, characterized in that the distance between the row conductors or the distance between the column conductors or the distance between both the row (4) and column conductors (5) varies over the surface of the fiber-reinforced composite material (1).

9. The fiber-reinforced composite material according to claim 1, characterized in that in the fiber-reinforced composite material (1) at least two independent, mutually parallel diode matrices (2) are arranged.

10. The fiber-reinforced composite material according to claim 1, characterized in that the network in the form of a diode matrix (2) forms a three-dimensional network within the fiber-reinforced composite material.

11. A method of monitoring the structure of a fiber-reinforced composite material according to claim 1, comprising the following steps:
    biasing the diode matrix (2) with a voltage by means of the signal processing means via the electrical conducting paths of a first group and the electrical conducting paths of a second group in the form that the diodes (3) of the diode matrix (2) connected in the intersection area (8) of the electrical conducting paths of a first group and the electrical conducting paths of a second group are operated in the reverse direction;
    reversing the polarity of the voltage for an electrical conducting path of a first group and of an electrical conducting path of a second group, whereby the diode (3) connected in the intersection area (8) of the electrical conducting path of a first group and of an electrical conducting path of a second group is driven in the forward direction;
    measuring the current flow via the electrical conducting path of a first group of the diode (2) connected at the intersection area (8) in the forward direction and the electrical conducting paths of a second group by means of the signal processing means;
    detecting a damage in the area of the conducting path due to an interruption of the current flow caused by a defective conducting path and/or diode (3); and
    repeating the previous steps, wherein in a re-measurement of the current flow by means of the signal processing means the electrical conducting path of the first and/or second group is different from the previous measurement.

12. A method according to claim 11, wherein the total power consumption of the sensor array for structural health monitoring of the composite material is measured.

* * * * *